W. H. CARRIER.
SYSTEM FOR CONTROLLING THE HUMIDITY AND TEMPERATURE OF AIR.
APPLICATION FILED APR. 23, 1908. RENEWED OCT. 9, 1912.
1,101,784.
Patented June 30, 1914.
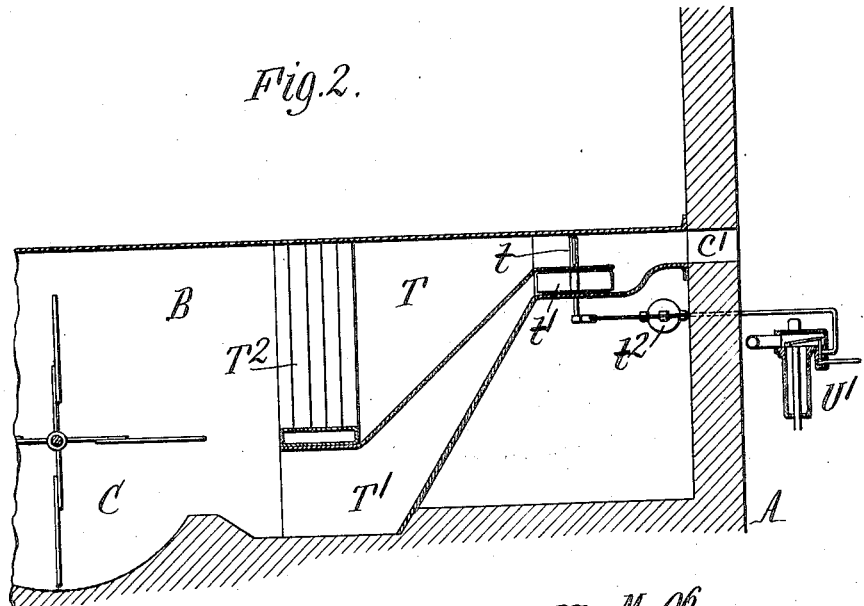
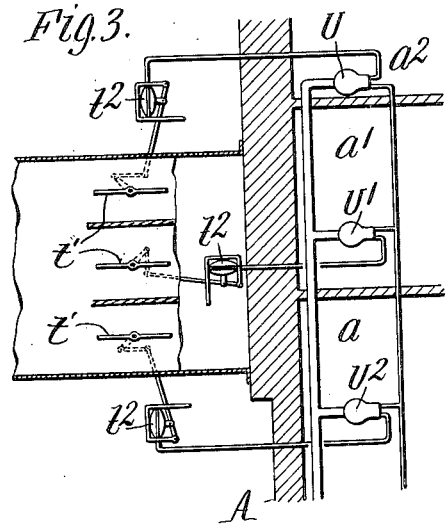
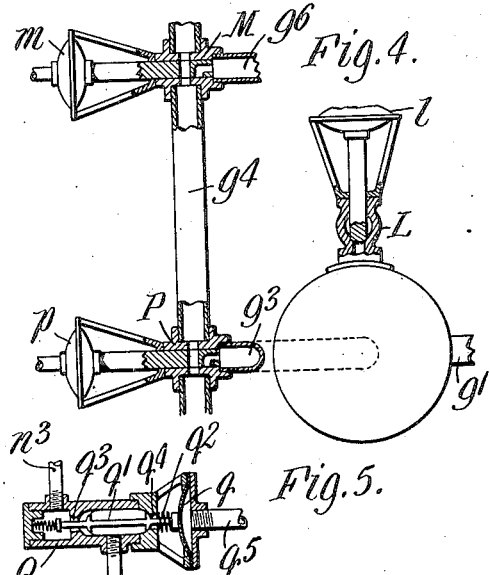
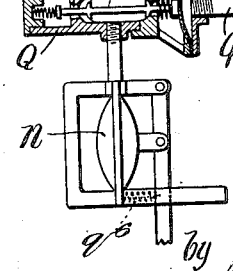

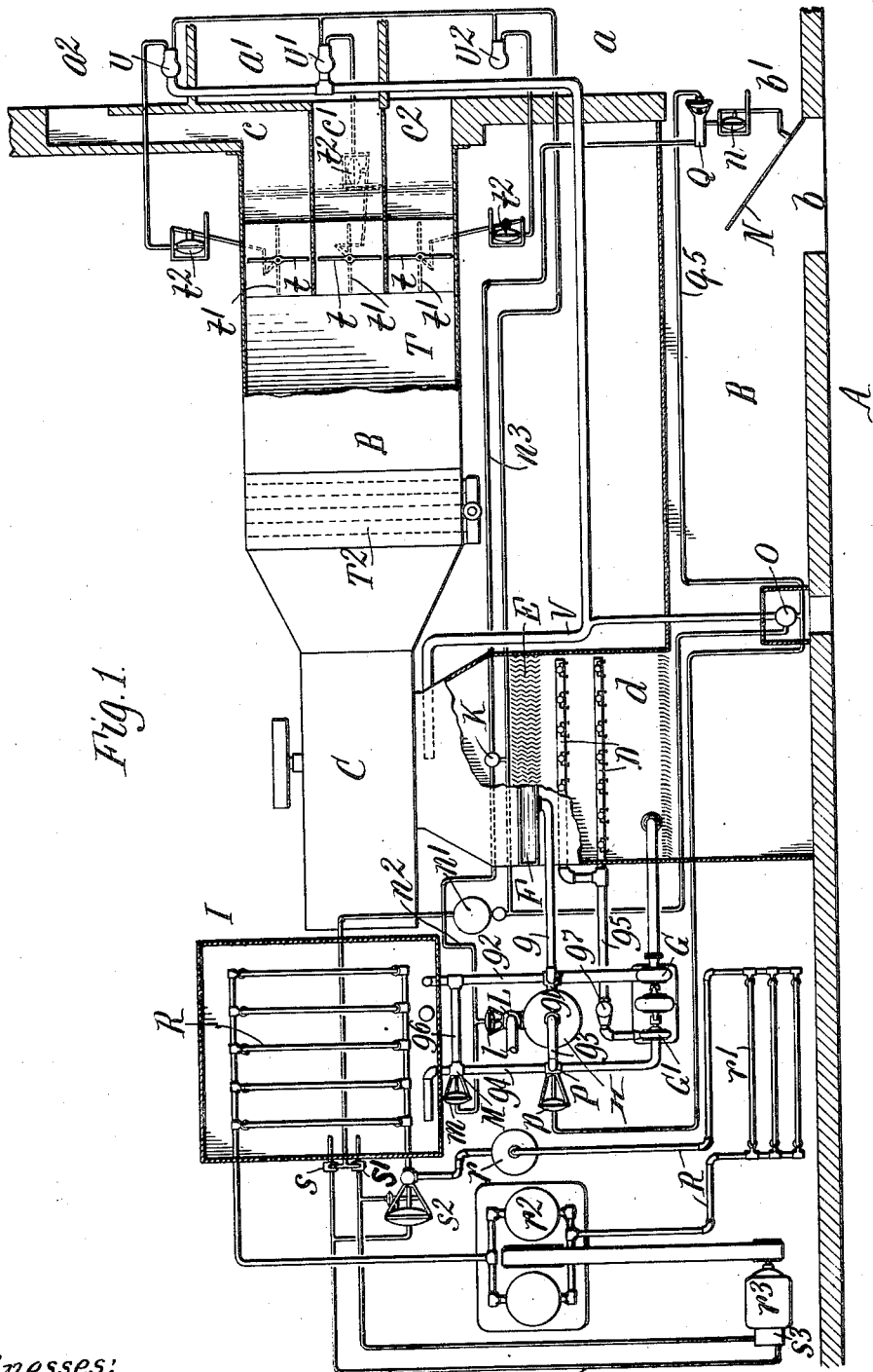

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

SYSTEM FOR CONTROLLING THE HUMIDITY AND TEMPERATURE OF AIR.

1,101,784.　　Specification of Letters Patent.　Patented June 30, 1914.

Application filed April 23, 1908, Serial No. 428,860. Renewed October 9, 1912. Serial No. 724,854.

*To all whom it may concern:*

Be it known that I, WILLIS H. CARRIER, a citizen of the United States, residing at Buffalo, in the county of Erie and State of New York, have invented a new and useful Improvement in Systems for Controlling the Humidity and Temperature of Air, of which the following is a specification.

This invention relates more particularly to systems for controlling the humidity and temperature of air in buildings and establishments where it is desirable or essential to maintain a uniform humidity and nearly uniform temperature of the air all the year around, or to regulate the conditions of humidity and temperature in different rooms as necessary by reason of the conditions prevailing in such rooms which have different effects on the atmosphere therein.

The object of the invention is to produce a practical and economical system which will automatically maintain a desired absolute humidity and nearly uniform desired temperature of the air in a room or building, notwithstanding great changes of humidity and temperature in the external atmosphere, and by which also the temperature and relative humidity in different rooms can be automatically regulated as required for each room.

This invention is in the nature of improvements in the system for heating and humidifying air disclosed in U. S. Patent No. 854,270, granted to me May 21, 1907, in which the absolute humidity of air supplied to the room or building is automatically regulated. The patented system is only intended to operate for normal changes of temperature in the external atmosphere between predetermined degrees.

The present system embodies two important features: The first consists of means whereby the absolute humidity and temperature of saturated air is secured and maintained at a fixed point regardless of variations in external atmospheric conditions above or below a prevailing point. The second feature consists of means whereby the temperature and relative humidity in each of several rooms are conjointly and interdependently controlled and the relative humidity is maintained at any desired degree regardless of the effect produced by radiation, infiltration of cold dry air or of warm moist air, or of moisture evaporation or moisture absorption occurring in the room. The first condition is secured by saturating air at a predetermined temperature with water spray in a humidifier, which is accomplished by heating or refrigerating means controlled automatically by a thermostat whose action is dependent upon the temperature of the saturated air. When the temperature of the spray water is at or above the temperature maintained by the thermostat, moisture is added to the air by evaporation to the point of saturation, the heat of evaporation being derived either from the water, or from the air, or from both conjointly. When the water is cooled below this temperature by refrigeration, moisture is condensed from the air and is separated therefrom by contact with the particles of water and by an eliminator, so that saturated air free from entrained moisture is obtained at the desired predetermined temperature. A wet tube thermostat is also employed for shifting the control from heater to refrigerator or refrigerator to heater, accordingly as external atmospheric conditions may demand, so that the two processes do not conflict, one neutralizing the effect of the other. The essential principle employed in securing the automatic transfer from refrigerating to heating depends upon the physical fact that when the water is neither heated nor refrigerated the air passing through the humidifier becomes saturated at the wet bulb temperature of the air entering the humidifier; therefore, it follows that whenever the outside wet bulb temperature is below the temperature maintained at the humidifier the water must be heated, and whenever the outside wet bulb temperature is above the temperature at the humidifier the water must be refrigerated. The means for conjointly regulating the temperature and relative humidity in the several rooms are controlled by a differential wet tube hygrostat which is placed in each of the rooms. This hygrostat, instead of controlling the amount of moisture admitted to the rooms as in the ordinary methods, controls instead the dry bulb temperature of the room, so that the dry bulb temperature bears a constant relation to the wet bulb temperature of said room, preferably, but not necessarily, by regulating the temperature of the humidified air supplied to the room. This relation is established by the mechanism of the hygrostat so that constant percents. of relative humidity are always obtained. Supposing there was no infiltration of dry or moist air and that there was no evaporation or moisture absorption by processes in the room, then the dry bulb temperature for a given per cent. of humidity would always remain constant since the air admitted to the room always contains a constant number of grains of moisture, since it is saturated at a fixed temperature. However, as these conditions cannot be entirely overcome and it is necessary that constant relative humidity be obtained, it becomes desirable to adopt the control as described above, which varies the temperature slightly to maintain absolutely constant relative humidity. As the dew point temperature at the apparatus is always necessarily maintained considerably below the room temperature, there is ample available refrigerating effect to maintain a lower temperature in the room than outside in summer, and to absorb the heating effect from machinery or other sources of heat in the room. This permits practically the same temperature to be maintained in summer as in winter.

In the accompanying drawings, consisting of two sheets: Figure 1 is a diagrammatic plan view, partly in section, of an apparatus embodying the invention for controlling the humidity and temperature of air in the rooms of a building. Fig. 2 is a fragmentary longitudinal sectional elevation of the air trunk and means for operating the dampers thereof. Fig. 3 is a sectional plan thereof. Fig. 4 is a plan view, partly in section, on an enlarged scale, of the valves controlling the flow of water used for humidifying the air. Fig. 5 is a sectional elevation of the operating means for the damper which controls the admission of air to the humidifier.

Like letters of reference refer to like parts in the several figures.

A represents a building or other inclosure having different rooms or apartments $a$ $a'$ $a^2$ which are to be supplied with air and the humidity and temperature of which are to be individually controlled; B an air trunk or passage having admission openings $b$ $b'$ respectively for external air and air returned from one or more rooms of the building; C a fan or device for causing air to flow through the trunk and into the rooms through separate passages or flues $c$ $c'$ $c^2$ in the air trunk; D humidifying devices for saturating the air in the humidifying chamber $d$ of the air trunk with moisture; and E means for eliminating the free water, together with the solid impurities, from the air.

The humidifying devices preferably consist of numerous spray nozzles of the cyclone type which discharge water under pressure in the form of a very fine spray or mist so as to thoroughly saturate the air in the humidifying chamber with moisture.

The eliminator preferably consists of a series of zig-zag plates arranged vertically and spaced apart to form numerous zig-zag passage ways between them for the air. The saturated air impinges against the oblique faces of the eliminator plates, and the free water together with the impurities from the air collect on the plates and flow down them into a collecting well in the bottom of the humidifier. A flushing tank F is also shown over the eliminator plates provided in its bottom with slots through which the water flows down between the eliminator plates for more thoroughly wetting their surfaces.

G represents a low pressure centrifugal pump which takes the water from the well in the humidifier and supplies it by pipes $g$ $g'$ and $g^2$ respectively to the flushing tank F, to a water heater H, and to a water cooler I; and G' represents a high pressure pump which takes the water from the heater and cooler by pipes $g^3$ and $g^4$ and supplies it by a pipe $g^5$ to the humidifying nozzles D.

$g^6$ is a by-pass pipe connecting the pipes $g^2$ and $g^4$ between the heater and cooler to permit the water to circulate without passing through either the heater or the cooler. By these means the same water with such addition of fresh water as may be required to make up for that assimilated by the air, can be repeatedly circulated, being taken from the collecting well of the humidifier and returned to the spray nozzles after more or less of it passes either through the heater, the cooler or the by-pass, depending upon the required temperature of the water delivered to the humidifying nozzles.

$g^7$ represents a strainer for removing impurities from the water supplied to the humidifying nozzles.

If preferred, fresh water can be supplied to the humidifying nozzles and the soiled water drained off from the eliminator.

The air humidifying and drying means and the water supplying and tempering means constructed as described have proven very efficient in practice and are therefore preferred, but the controlling means of the system, about to be described, are not dependent upon these particular means and any suitable means can be employed for these purposes.

K represents an ordinary thermostat located in the discharge end of the humidifier, or in any other suitable place where it will be subjected to the temperature of the saturated air leaving the humidifier, for maintaining a constant temperature of the dew point or saturated air in the humidifier. For this purpose the thermostat K in the system illustrated controls a valve L, Fig. 1, which regulates the supply of steam to the water heater, and also a three-way valve or vice M regulating the flow of water
rough the by-pass pipe $g^6$, to thereby gov-
n the temperature of the spray water. The
ermostat K also controls a damper N
hich regulates the proportions of external
 and return air from the building ad-
itted to the humidifier by more or less
ening one and closing the other of the air
mission openings $b$ $b'$. These valves and
e damper are actuated by diaphragms or
otors $l$, $m$ and $n$, respectively, of well
own construction operated by compressed
 supplied from a reservoir $n'$, or other
urce of supply, through suitable pipes $n^2$
d $n^3$ controlled by the thermostat K. This
ermostat, under the influence of the tem-
rature of the saturated air in the humidi-
r, operates through the conjoint action of
e steam supply valve L the three-way
lve M and the damper N to keep the satu-
ted air in the humidifier at a predeter-
ined fixed temperature. The air from the
midifier being saturated with water at a
nstant temperature, its moisture contents
main constant, that is, the air contains al-
ys the same number of grains of moisture
r cubic foot, and the relative humidity of
e air in the room or rooms to which this
turated air is admitted will therefore de-
nd upon the temperature in said room or
oms.

The actuating devices $l$, $m$ and $n$ for the
lves L and M and damper N are adjust-
 so that when the temperature of the ex-
rnal air rises to a predetermined degree
e valve L will completely shut off the
am from the water heater and the dam-
r N will close the admission opening $b'$
r return air, whereby only unheated wa-
 and external air will be used in the
midifier; the cooler and by-pass being
ndered inoperative at this time by means
reinafter described, and the temperature
 the dew point in the humidifier becomes
at of the wet bulb temperature of the ex-
rnal air entering the humidifier. This
 due to the fact that saturation occurs
thout addition of heat to the air or water
 a temperature which is the same as the
t bulb temperature of the external air.
 the wet bulb temperature of the external
mosphere exceeds the temperature of the
w point in the humidifier for which the
ermostat K is adjusted, then it becomes
cessary to dehumidify or extract moisture
om the air admitted to the humidifier.
r this purpose a thermostat O is employed
hich is influenced by the wet bulb tempera-
re of the external atmosphere and controls
 three-way valve P, or other device, for
sconnecting the supply pump for the
ray nozzles from the heater and connect-
g it to the cooler so that only refrigerated
ter will be supplied to the humidifying
zzles D. This three-way valve or device P is actuated by a diaphragm or motor $p$
which can be operated by compressed air
controlled by the thermostat O as in the
case of the other three-way valve M. The
thermostat O is adjusted so that it is nor-
mally inactive, but when the wet bulb tem-
perature of the external atmosphere equals
the temperature of the dew point for which
the other thermostat K is adjusted, it goes
into action and causes the three-way valve
P to move to the position shown in Fig. 4,
in which it closes the pipe $g^3$ from the
heater and opens the pipe $g^4$ from the cooler.
Only cool or refrigerated water will then be
supplied to the spray nozzles and the tem-
perature of this water will be regulated as
required to maintain the predetermined
temperature of the dew point in the humidi-
fier, by the valve M, which, under the action
of the thermostat K, controls the propor-
tions of water taken from the cooler and
from the by-pass. This refrigerated water
will chill the air entering the humidifier and
cause a precipitation of its moisture, or the
formation of dew, whereby a portion of the
moisture contents of the air will be ex-
tracted or its absolute humidity lowered.
The wet bulb thermostat O also preferably
controls an air-operated device Q, Figs. 1
and 5, by which the damper N is caused to
close the admission opening $b$ for external
air when the wet bulb temperature of the
external air exceeds the temperature of the
dew point in the humidifier, so that only re-
turn air from the building is admitted to
the humidifier. This is done for economy.
The device Q, see Fig. 5, consists of a dia-
phragm $q$ and a valve $q'$ which is actuated
thereby and controls the flow of air to and
from the damper-actuating motor $n$. The
valve $q'$ is normally held by a spring $q^2$ in
the position shown in Fig. 5, in which it
opens an inlet port $q^3$ and closes an exhaust
port $q^4$ in its casing. Air can then pass the
valve to the damper-actuating motor $n$.
When, however, the thermostat O operates
to shut off the water heater, air is admitted
to the diaphragm $q$ by a pipe $q^5$ and the
valve $q'$ is shifted to close the inlet port $q^3$
and open the exhaust port $q^4$ which permits
the air to escape from the damper-actuating
motor $n$ and the damper will be moved to
close the external air admission opening $b$
by a spring $q^6$ shown by dotted lines in
Fig. 5, or other means. If desired, the auto-
matic thermostat O and the means operated
thereby could be omitted and the cold water
turned on manually when the external at-
mospheric conditions make it necessary to
de-humidify the air.

The water in the cooler is kept between
the predetermined maximum and minimum
temperatures requisite for dehumidifying
the air as explained, by an ordinary refrig-
erating plant comprising ammonia circulating pipes R, a supply tank $r$, a condenser $r'$, and a compressor $r^2$ operated by a motor $r^3$. This refrigerating plant can be controlled manually but is preferably controlled automatically by maximum and minimum temperature thermostats $s$ $s'$ located in the cooler and operating a suitable valve $s^2$ in the circulating system and also a controller $s^3$ for the motor through suitable air-operated motors or devices, such as previously described. When the temperature of the water rises to the predetermined maximum degree, the thermostat $s$ operates to start the motor and compressor and open the valve $s^2$, and the refrigerating means operate to lower the temperature of the water to the predetermined minimum degree, when the other thermostat $s'$ operates to stop the motor and compressor and close the valve $s^2$. The refrigerating plant then remains inactive until the temperature of the water again rises to the maximum degree. Any other suitable means, whether automatic or not, could be employed for keeping the water in the cooler at a suitable temperature.

For independently regulating the temperature and relative humidity in the rooms of the building, the flues $c$ $c'$ $c^2$ leading to the several rooms connect with the air trunk B by branch hot and cold air passages T T' controlled by dampers $t$ $t'$, respectively, and a steam radiator or other air heater $T^2$ is placed in the hot air branch passage T. The dampers $t$ $t'$ for each of the flues $c$ $c'$ $c^2$ are connected so that as one opens the other closes, thus permitting a mixture of any desired proportions of hot and cold air to be delivered to each room. The dampers for the several flues are separately actuated by air-operated motors or devices $t^2$ controlled by hygrostats U U' $U^2$ located in the several rooms. Hygrostats, such as disclosed in Patent No. 896,690, granted August 18, 1908, to myself, assignor to the Buffalo Forge Company, which have differentially acting elements influenced by the wet and dry bulb temperatures of the rooms, are preferably employed. Each hygrostat operates through the motor $t^2$ and dampers controlled thereby to regulate the proportions of hot and cold air delivered to the room in which it is located and thereby consequently governs the temperature and relative humidity in such room, so that the atmospheric conditions of the several rooms are independently controlled. Any other suitable means controlled by the hygrostats could be used for regulating the temperature of the air delivered to the rooms, or the humidistats could control the room temperatures by governing separate sources of heat for the rooms, or in any other suitable way.

V represents an exhaust pipe having branches connecting the thermostat O and the several hygrostats U U' $U^2$ with the fan C for creating a circulation of air past these instruments to insure the proper action thereof.

It has not been attempted in this application to describe or illustrate in detail the construction of the various instruments and devices employed in the system, as the invention does not relate to the same, and any devices capable of performing the functions stated could be employed.

I claim as my invention:

1. The combination of humidifying means for saturating air with water, means for heating the water to add moisture to the air when the wet bulb temperature of the air being treated is below a predetermined temperature of the saturated air, means for cooling the water to condense moisture from the air when the wet bulb temperature of the air being treated is above said predetermined temperature of the saturated air, and automatic means for controlling the said heating and cooling means to maintain said predetermined temperature of the saturated air, substantially as set forth.

2. In a system for controlling the humidity of air, means for saturating the air with moisture at a predetermined substantially constant temperature, including means for raising the temperature of the water in the humidifier above said constant temperature of the saturated air for adding moisture to the air, and for lowering the temperature of the water below said constant temperature of the saturated air for removing moisture from the air, substantially as set forth.

3. The combination of a humidifier for air, automatic means influenced by the humidified air for maintaining a substantially constant saturation temperature thereof, and additionl means governed by the wet bulb temperature of the air admitted to said humidifier for lowering the temperature of the water supplied to the air for dehumidifying the air when the wet bulb temperature of the air admitted to the humidifier exceeds said constant temperature of the humidified air, substantially as set forth.

4. The combination of a humidifier for air, automatic means influenced by the humidified air for maintaining a predetermined substantially constant saturation temperature of said humidified air, and automatic means governed by the wet bulb temperature of the air admitted to said humidifier and acting when such temperature exceeds a predetermined degree to dehumidify the air admitted to the humidifying means, substantially as set forth.

5. The combination of a humidifier for air, automatic means influenced by the humidified air for regulating the temperature of the humidifying water to normally maintain a predetermined substantially constant saturation temperature of said humidified air, and additional automatic means governed by the air admitted to said humidifying means which are normally inactive and operate upon a predetermined wet bulb temperature of the air admitted to the humidifier to lower the temperature of the humidifying water, substantially as set forth.

6. The combination of a humidifier for air, automatic means influenced by the humidified air for regulating the temperature in the humidifier to normally maintain a predetermined substantially constant saturation temperature of the humidified air, and additional automatic means governed by the wet bulb temperature of the air admitted to said humidifier which are normally inactive and operate upon a predetermined wet bulb temperature of the air admitted to the humidifier to lower the temperature of the humidifying water, substantially as set forth.

7. The combination of a humidifier for air, automatic means influenced by the humidified air for regulating the temperature of the humidifying water to normally maintain a predetermined substantially constant saturation temperature of the humidified air, means for refrigerating the humidifying water, and additional automatic means governed by the wet bulb temperature of the air admitted to said humidifier which are normally inactive and operate upon a predetermined wet bulb temperature of the air admitted to the humidifier to render said water heating means inactive and said refrigerating means active, substantially as set forth.

8. The combinaton of a humidifier for air, means influenced by the humidified air and acting automatically when the wet bulb temperature of the air admitted to the humidifier is below a predetermined degree to maintain a predetermined substantially constant saturation temperature of the humidified air, and means governed by the wet bulb temperature of the air admitted to the humidifier which are normally inactive and operate automatically when the wet bulb temperature of the air admitted to the humidifier exceeds a predetermined degree to lower the temperature of the air in the humidifier to dehumidify it, substantially as set forth.

9. The combination of means for delivering air to an inclosure, a humidifier for the air, automatic means influenced by the humidified air for regulating the temperature of the humidifying water and admitting external air and return air from said inclosure in different proportions to said humidifier to normally maintain a predetermined substantially constant saturation temperature of the humidified air, and means governed by the wet bulb temperature of the external air which are normally inactive and operate automatically when the wet bulb temperature of the external air exceeds a predetermined degree to lower the temperature of the humidifying water and admit only return air from the inclosure to said humidifier, substantially as set forth.

10. The combination of a humidifier for air, means influenced by the humidified air for maintaining a substantially constant saturation temperature thereof, means for conveying the humidified air to separate rooms, means for heating a portion of the humidified air, and differential hygrostats governed by the wet and dry bulb temperatures of the air in the several rooms for separately controlling the proportions of heated and unheated air delivered to the rooms to independently regulate the temperature and relative humidity in the several rooms, substantially as set forth.

11. The combination of a humidifier for air, means influenced by the humidified air for maintaining a substantially constant saturation temperature thereof, branch passages for conveying the humidified air to an inclosure, means for changing the temperature of the air in one of said branch passages, and a differential hygrostat governed by the wet and dry bulb temperatures in said inclosure for varying the proportions of air delivered from said branch passages to said inclosure to regulate the temperature and relative humidity of the air thereof, substantially as set forth.

12. The combination of an air humidifier for saturating air with water, heating means for raising the temperature in the humidifier to add moisture to the air when the wet bulb temperature of the air being treated is below a predetermined temperature of the saturated air, cooling means for lowering the temperature in the humidifier to condense moisture from the air when the wet bulb temperature of the air being treated is above said predetermined temperature of the saturated air, and automatic means for controlling said heating and cooling means to maintain said predetermined temperature of the saturated air, substantially as set forth.

13. The combination of an air humidifier, heating means and cooling means for altering the temperature in the humidifier, automatic means influenced by the humidified air for controlling said heating means or said cooling means to maintain a predetermined substantially constant saturation temperature of the humidified air, and additional automatic means which are normally inactive and operate upon a predetermined wet bulb temperature of the air admitted to the humidifier to transfer the control of said controlling means from said heating means to said cooling means, substantially as set forth.

14. The combination of a humidifier for air, means influenced by the humidified air for maintaining a substantially constant saturation temperature thereof, means for conveying the humidified air to an inclosure, a hygrostat governed by the hygrometric condition of the air in the inclosure, and instrumentalities controlled by said hygrostat for controlling the temperature of the humidified air delivered to the inclosure to regulate the humidity in the inclosure, substantially as set forth.

15. The combination of a humidifier for air, means influenced by the humidified air for maintaining a substantially constant saturation temperature thereof, means for conveying the humidified air to an inclosure, a differential hygrostat governed by the wet and dry bulb temperatures of the air in the inclosure, and instrumentalities controlled by said hygrostat for controlling the temperature of the humidified air delivered to the inclosure to regulate the humidity in the inclosure, substantially as set forth.

16. The combination of a humidifier for air, means influenced by the humidified air for maintaining a substantially constant saturation temperature thereof, means for conveying the humidified air to separate rooms, hygrostats governed by the hygrometric conditions in the several rooms, and instrumentalities controlled by said hygrostats for separately controlling the temperature of the humidified air delivered to each room to independently regulate the humidity in the several rooms, substantially as set forth.

Witness my hand, this 6th day of April, 1908.

WILLIS H. CARRIER.

Witnesses:
C. W. PARKER,
C. B. HORNBECK.